United States Patent
Fu et al.

(10) Patent No.: US 9,684,502 B2
(45) Date of Patent: Jun. 20, 2017

(54) APPARATUS, SYSTEMS, AND METHODS FOR DISTRIBUTED APPLICATION ORCHESTRATION AND DEPLOYMENT

(71) Applicant: Cliqr Technologies, Inc., Santa Clara, CA (US)

(72) Inventors: Tianying Fu, San Jose, CA (US); Saad Ali Malik, Milpitas, CA (US); Gautam Joshi, San Jose, CA (US); Abhinav Nagaraj, San Jose, CA (US)

(73) Assignee: CLIQR TECHNOLOGIES, INC., San Jose, CA (US)

(*) Notice: Subject to any disclaimer, the term of this patent is extended or adjusted under 35 U.S.C. 154(b) by 0 days.

(21) Appl. No.: 14/749,531

(22) Filed: Jun. 24, 2015

(65) Prior Publication Data

US 2016/0378450 A1    Dec. 29, 2016

(51) Int. Cl.
    *G06F 9/445*    (2006.01)
    *G06F 3/00*     (2006.01)
    *G06F 15/16*    (2006.01)
    *H04L 29/08*    (2006.01)
    *G06F 9/455*    (2006.01)

(52) U.S. Cl.
    CPC ............ *G06F 8/61* (2013.01); *G06F 8/60* (2013.01); *G06F 9/45558* (2013.01); *H04L 67/34* (2013.01); *G06F 2009/45562* (2013.01)

(58) Field of Classification Search
    None
    See application file for complete search history.

(56) References Cited

U.S. PATENT DOCUMENTS

| | | | |
|---|---|---|---|
| 6,910,070 B1* | 6/2005 | Mishra | G06F 9/542 707/999.201 |
| 2003/0110192 A1* | 6/2003 | Valente | G06F 21/50 715/234 |
| 2004/0078440 A1* | 4/2004 | Potter | G06F 9/542 709/206 |

(Continued)

OTHER PUBLICATIONS

Zehe, Daniel et al. "SEMSim Cloud Service: Large-scale urban systems simulation in the cloud". Simulation Modelling Practice and Theory. Jun. 8, 2015.*

*Primary Examiner* — Adam Lee
(74) *Attorney, Agent, or Firm* — Venkatesh Krishnamoorthy; Silicon Valley Patent Group LLP

(57) ABSTRACT

Embodiments disclosed facilitate distributed orchestration and deployment of a cloud based distributed computing application. In some embodiments, the distributed orchestration may be based on a cloud agnostic representation of the application. In some embodiments, an ordered set of events may be obtained based on a starting sequence for the plurality of components, where each event in the ordered set is associated with a corresponding set of prerequisites for initiating execution of the event. Event identifiers corresponding to the ordered set of events may be placed on an event message bus with persistence that is shared between a plurality of distributed nodes associated with a cloud. Upon receiving an indication of completion of prerequisites for one or more events, a plurality of nodes of a distributed orchestration engine may select the one or more events corresponding to the one or more selected event identifiers for execution on the cloud.

27 Claims, 7 Drawing Sheets

(56) References Cited

U.S. PATENT DOCUMENTS

| | | | |
|---|---|---|---|
| 2010/0011373 A1* | 1/2010 | Youel | G06Q 10/107 719/313 |
| 2010/0088150 A1* | 4/2010 | Mazhar | G06F 9/5088 717/120 |
| 2011/0131316 A1* | 6/2011 | Ferris | G06F 9/542 709/224 |
| 2012/0179645 A1* | 7/2012 | Lomet | G06F 17/30575 707/607 |
| 2013/0275987 A1* | 10/2013 | Meijer | G06F 9/466 718/103 |
| 2014/0074575 A1* | 3/2014 | Rappoport | G06Q 30/0222 705/14.17 |
| 2014/0282495 A1* | 9/2014 | Chico de Guzman Huerta | G06F 8/61 717/177 |
| 2014/0359046 A1* | 12/2014 | Colle | H04L 29/06 709/213 |
| 2014/0372376 A1* | 12/2014 | Smith | G06F 17/30578 707/624 |
| 2015/0378703 A1* | 12/2015 | Govindaraju | G06F 8/60 717/174 |

* cited by examiner

APPARATUS, SYSTEMS, AND METHODS FOR DISTRIBUTED APPLICATION ORCHESTRATION AND DEPLOYMENT

BACKGROUND

Field of the Invention

The present invention relates to the field of distributed computing and in particular, to apparatus, systems, and methods to facilitate distributed orchestration and deployment of cloud-based applications including multi-tier applications.

Description of Related Art

The performance of computing applications may often be increased by distributing the computational workload across a networked cluster of computers. A physical networked cluster of computers with attendant software facilitating virtualization is often referred to as a "cloud" or "cloud infrastructure" or simply an infrastructure. Cloud computing facilitates on-demand access to resources, which may be rapidly scaled up or down in proportion to user requirements.

Clouds may be public and/or private. For example, publicly available clouds or "public clouds", may be accessed programmatically (e.g. using Application Programming Interfaces (APIs)) over the Internet and may be made available as virtual machines (VMs) on a pay-per-use basis by third parties to customers. On the other hand, organizations may have private clouds for use by employees or customers within an enterprise's data center and/or may use a hybrid cloud, which may be a combination of public-private clouds to deploy and run applications.

When a cloud based application is deployed on a cloud, resources for the application may be provisioned, and one or more services that components of the application depend upon may be started in some specified order in a process termed orchestration. Cloud orchestration refers to processes to automate (at least partially) a variety of tasks related to managing and coordinating software, resources, and services on a cloud. Conventional techniques for cloud orchestration may give rise to inefficiencies, may create bottlenecks, and may also decrease fault tolerance.

Therefore, there is a need for systems, methods and apparatus to facilitate efficient orchestration and deployment of distributed applications including cloud-based applications.

SUMMARY

Consistent with embodiments disclosed herein, various exemplary apparatus, systems and methods for facilitating the orchestration and deployment of cloud based applications are described.

In some embodiments, a processor-implemented method may comprise: obtaining, based, in part, on a representation of a cloud-based distributed computing application comprising a plurality of components, an ordered set of events based on an execution sequence for the plurality of components, wherein each event in the ordered set is associated with a corresponding set of prerequisites for initiating execution of the event; receiving, on a shared event message bus with persistence, event identifiers corresponding to one or more events in the ordered set that are ready for execution, wherein the event message bus is shared between a plurality of nodes associated with a cloud, and wherein, for each event in the ordered set that is ready for execution, prerequisites in a corresponding set of prerequisites for initiating execution of the event have been satisfied; and selecting one or more event identifiers, corresponding to the one or more of the events ready for execution, from the event message bus.

In another embodiment, an apparatus may comprise: a memory comprising a representation of a cloud-based distributed computing application comprising a plurality of components; an event message bus with persistence, and a plurality of nodes associated with a cloud, wherein the plurality of nodes are coupled to the memory and the event message bus. In some embodiments, the plurality of nodes may be configured to: obtain, based, in part, on the representation of the cloud-based distributed computing application, an ordered set of events based on an execution sequence for the plurality of components, wherein each event in the ordered set is associated with a corresponding set of prerequisites for initiating execution of the event; receive, on the shared event message bus, one or more event identifiers corresponding to one or more events in the ordered set that are ready for execution, wherein, for each event in the ordered set that is ready for execution, prerequisites in a corresponding set of prerequisites for initiating execution of the event have been satisfied; and select, from the shared event message bus, one or more of the event identifiers corresponding to the one or more of the events ready for execution.

In a further embodiment, a non-transitory computer-readable medium may comprise instructions, which, when executed by a processor, perform steps in a method, where the steps may comprise: obtaining, based, in part, on a representation of a cloud based distributed computing application comprising a plurality of components, an ordered set of events based on an execution sequence for the plurality of components, wherein each event in the ordered set is associated with a corresponding set of prerequisites for initiating execution of the event; receiving, on a shared event message bus with persistence, event identifiers corresponding to one or more events in the ordered set that are ready for execution, wherein the event message bus is shared between a plurality of nodes associated with a cloud, and wherein, for each event in the ordered set that is ready for execution, prerequisites in a corresponding set of prerequisites for initiating execution of the event have been satisfied; and selecting one or more event identifiers, corresponding to the one or more of the events ready for execution, from the event message bus.

Embodiments also relate to software, firmware, and program instructions created, stored, accessed, or modified by processors using computer-readable media or computer-readable memory. The methods described may be performed on processors, various types of computers, and computing systems —including distributed computing systems such as clouds. The methods disclosed may also be embodied on computer-readable media, including removable media and non-transitory computer readable media, such as, but not limited to optical, solid state, and/or magnetic media or variations thereof and may be read and executed by processors, computers and/or other devices.

These and other embodiments are further explained below with respect to the following figures.

DETAILED DESCRIPTION

Figure 1:
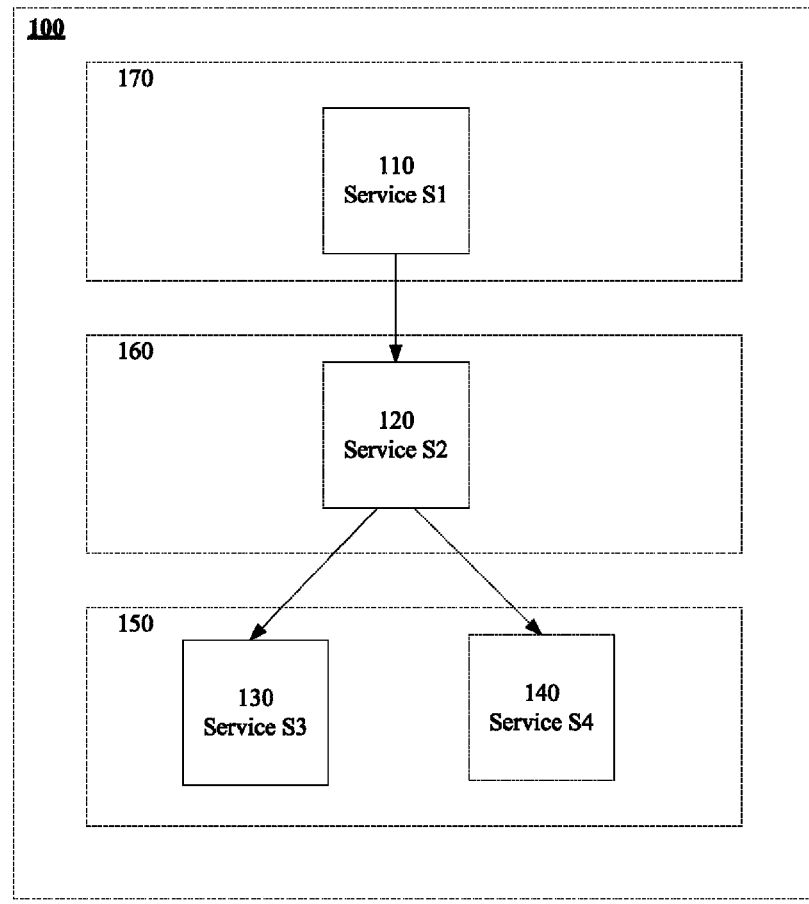
FIG. 1 shows an exemplary multi-tier cloud application illustrating an initialization sequence based on service dependencies.

In accordance with embodiments disclosed herein, apparatus, systems and methods to facilitate distributed application orchestration of cloud-based applications are presented.

A physical networked cluster of computers with attendant software facilitating virtualization is often referred to as a "cloud" or "cloud infrastructure" or simply an infrastructure. The software layer permits the underlying physical hardware associated with clouds, which can include servers, memory, storage, and network resources, to be viewed as virtualized units. These virtualized units represent some fraction of the underlying computing hardware or resources supported by the cloud infrastructure. Therefore, from a logical perspective, clouds may be viewed as a collection of VMs. Typically, a cloud may provide a variety of VM types with different computing (CPU), memory, storage, networking, and Operating System (OS) options.

Clouds, thus, provide access to computing infrastructure remotely, including compute, storage and network resources, so that the resources can be reserved, provisioned, accessed and released programmatically. For example, programmatic interfaces such as Application Programming Interfaces (APIs), System Development Kits (SDKs), Web Services, etc. may be used to access resources made available by clouds remotely over a wide-area network (WAN).

VMs are typically software implementations of a computer. VMs often provide a complete system platform, which may also support the execution of a complete operating system by the VM in addition to one or more applications. One method of deploying VMs on clouds may use images termed Virtual Machine Images (VMIs), which are typically filesystem images including an operating system, application servers and/or application(s) to be executed by the VM, data, and a cloud specific portion.

Cloud computing may thus be viewed broadly in terms of three models. In the Infrastructure-as-a-Service (IaaS) model, cloud providers supply the compute, network and storage mechanisms but cloud customers may run, manage, and configure their (e.g. operating system and applications) own VMs. In systems based on an IaaS model, the provider may manage the underlying physical cloud infrastructure. In the Platform-as-a-Service (PaaS) model, cloud providers supply a platform, which includes a preconfigured software stack, upon which customers may run applications. In systems based on a PaaS model, the PaaS provider may manage the platform (infrastructure and software stack), while the run-time execution environment may be managed by users. In the Software-as-a-Service (SaaS) model, the cloud provider may additionally provide ready to use software applications such as financial or business applications for customer use. In systems based on an SaaS model, the SaaS provider may manage the cloud infrastructure, any software stacks, and the ready to use applications.

A "cloud node" or "node" may be responsible for the control and operation of one or more VMs, and there may be several nodes per cloud. In some embodiments, one or more cloud nodes may be involved in orchestration, including the start up, monitoring, tear down and/or migrations of applications running on a cloud. Because of virtualization and depending on the resources allocated to a cloud node, the cloud node may take the form of a virtual server, which may be implemented, in part, by using one or more physical processors or some fraction thereof of the available processing power.

In conventional schemes, for users who deploy or desire to deploy one or more applications on multiple clouds, the process of orchestrating application deployment can be inefficient. Because conventional orchestration actions are cloud specific, orchestration program code is rewritten and separately updated, maintained and debugged for each cloud on which an application executes, thereby resulting in effort duplication and higher costs. Further, when a single node is used to orchestrate tasks, the orchestration is inefficient, creates bottlenecks and is susceptible to a single point of failure.

To deploy a cloud based application, resources (compute, storage, network, services etc) for the application may be provisioned, and one more services that components of the application depend upon may be started in some specified order in a process termed orchestration. For example, an initialization script may be launched after a VM is booted for the first time, which may specify a sequence of tasks (installing and/or configuring software, etc) to be performed. In general, cloud orchestration refers to the automation (or partial automation) of a variety of tasks related to managing and coordinating software, resources, and services on a cloud. Upon completion of orchestration, the system may deliver some defined functionality. Thus, orchestration stitches together software and hardware components in the cloud to deliver the desired functionality. In some embodiments, workflows may be used to specify how the software and hardware components are brought up and stitched together to deliver the desired functionality. In situations where the tasks involved in orchestration have dependencies and constraints orchestration may be time consuming and cumbersome.

Disclosed embodiments facilitate the distributed orchestration and deployment of distributed applications, including multi-tier applications. In some embodiments, the distributed orchestration and deployment may be based on a cloud agnostic or cloud independent representation, which may facilitate orchestration and deployment across one or more clouds. In some embodiments, the orchestrator may take the form of a Distributed Orchestration Engine (DOE), which may be cloud-based. In some embodiments, the DOE may run on a plurality of nodes (e.g. VM servers), which may interface with the cloud infrastructure(s) or cloud provider(s) to deploy and/or manage cloud based applications. Consistent with some disclosed embodiments, the DOE may facilitate orchestration across multiple distinct clouds, based, in part, on a cloud agnostic representation of the cloud-based distributed computing application.

As used herein, the terms "cloud independent representation" and "cloud agnostic representation" are used synonymously and refer to a representation of a distributed computing application that may be deployed on a plurality of clouds. The "cloud independent representation" or "cloud agnostic representation" may include a representation of an underlying pattern of execution and/or resource utilization of the distributed computing application. In some embodiments, the "cloud independent representation" or "cloud agnostic representation" may take the form of application descriptors and/or metadata that are not specific to any particular cloud. The "cloud agnostic representation" or "cloud independent representation" may be used to obtain cloud specific commands and/or parameters at the time of orchestration and/or deployment of the distributed computing application on a specific cloud in a manner consistent with embodiments disclosed herein.

FIG. 1 illustrates an exemplary multi-tier cloud application illustrating an initialization sequence based on service dependencies. The term multi-tier application refers to applications that exhibit and/or are structured in, tiers or layers, where each tier or layer may provide one or more services. Except where otherwise specified, the term "service" as used herein refers broadly to software that facilitates delivery of functionality, content etc, over a network (including, for example, web server services, database services, load balancing services, caching services etc) and/or applications which may include standalone program code and/or program code that functions in combination with one or more of the above "services".

The term "services" is also used to refer to Virtual Machine Images (VMIs), which may be provided as IaaS. In some embodiments, VMIs may include service binaries and descriptors describing service phases and commands to be executed at various phases (e.g. before or after installation, startup, migration, shutdown, etc). In addition, "services" may also include "end-point based services," which may be provided as PaaS. As indicated earlier, the term "end point based service" or PaaS is used to refer to categories of services where the service provider makes available both a computing platform and a solution stack associated with the platform as a service to users. End-point based services may be available, for example, from one or more vendors. External endpoint based services or external endpoints refer to services that are external to a cloud-based application (e.g. a multi-tier cloud based application), where the services are accessible from within the cloud-based application. For example, an end-point based service such as Amazon Relational Database Service (RDS) provided by Amazon may be used to set up a cloud-based relational database that is accessible to and/or may be used by a deployed cloud based multi-tier application generated from cloud agnostic representation of multi-tier application.

For example, a multi-tier application may include three tiers, which may take the form of a web tier, application tier, and a database tier. Each tier may comprise one or more services. The web tier may provide services to manage incoming hypertext transfer protocol ("http") requests. The web-tier may serve the static content and make REpresentational State Transfer calls or RESTful calls to the application layer. REST is a stateless client-server, cacheable communications protocol, which may use the HTTP protocol to effect the creation, updating, reading, and/or deletion of data. The application tier may provide application specific services such as business logic based on input received from the web tier and services to generate queries to and/or process response received from the database tier. Services in the database tier may process queries received from the application tier, retrieve data from a database, and send query responses to the application tier, which, in turn, may process the received responses and provide the processed data to the web tier. Further, each tier in the multi-tier cloud based application may include one or more IaaS, and/or PaaS, and/or SaaS components. In some embodiments, a multi-tier application may be structured or configured so that application components in one tier of the multi-tier application may be dependent on one or more components in an immediately preceding tier. The term "component", when used in the context of an application, is used herein to refer to a discrete unit of a cloud-based application. A component may include one or more additional components. For example, a component may be a service, a nested application within a larger application, standalone program code, etc.

FIG. 1 shows an exemplary multi-tier application 100 with four services illustrating an initialization sequence based on dependencies among the services.

In general, as shown in FIG. 1, there are dependencies between services in different application tiers in a multi-tier application. The application topology of a multi-tier application may include a representation of the tiers, the services in each tier and the dependencies between services in the multi-tier application. For an application that includes a plurality of components, the term "application topology" refers to the pattern of dependencies between the components. For example, these dependencies may determine sequences specific to starting, running, migrating, updating, terminating and/or performing other actions related to the multi-tier cloud based application. In some embodiments, the dependencies may also specify and/or be used to obtain a sequence of events to integrate an application with one or more clouds.

For example, the dependencies in a multi-tier application may be used to determine an order or sequence for starting services in the multi-tier application.

In general, dependency information may include information about pre-requisites for starting, deploying and/or running a service. Dependency information may include information about service dependencies, residence dependencies, runtime dependencies, resource dependencies etc. The term "prerequisites" when used in relation to a service or component of a cloud-based application refers to an ordered set of events that are performed prior to performing some specified operation related to the service or component. When the events in an ordered set associated with a component or a service have been performed, the prerequisites for that component may be satisfied and the specified operation may be performed.

The ordered set of events may include a list of events and specify a sequence for initiating execution of the events in the ordered set. For example, service S2 120 may be started when services S3 130 and S4 140 have been started. The sequence may include events in the ordered set that may be started or executed concurrently or in parallel. For example, services S3 130 and S4 140 may be started in parallel, after which service S2 120 may be started. Service S4 140 may be started after its prerequisites given by the set of services S4 140, S3 130, and S2 120 have all been started. If an operation on a service or component may be performed without regard to other events, then, that service or component may have no prerequisites and the ordered set may be empty.

In general, the prerequisites for a service or component may include: temporal dependencies, which are events to be completed by a time when some operation is performed on the service or component; and/or resource dependencies, which are resources to be available when the operation is performed on the service or component; and/or placement dependencies, which may specify a distribution of one or more other application components on the cloud when the operation is performed on the service or component.

For example, service dependency information may be used to specify that the starting of a first service is dependent on the starting of and/or attainment of some state (e.g. an execution state) of one or more other services. For example, service dependency information may specify that service S2 120 may be started when services S3 130 and S4 140 have been started. In some instances, service dependency information for a first service may also specify that the first service cannot depend on one or more other services. For example, dependency metadata specifying that a first service cannot depend on a second service may used during system configuration to prevent configurations where the first service depends on the second service.

As another example, residence dependency information may include VM co-residency information and/or VM placement information. VM co-residency information for a first component (e.g. a service or a nested application that is part of a multi-tier application) may specify information about other components that may be co-resident with the first component on a given VM when deployed. In some instances, VM co-residency information for a first service may specify that the first service cannot be co-resident with one or more other specified services running on the same VM. In some embodiments, the VM placement information may specify a mapping of components to VMs. For example, VM placement information may determine how application components are distributed among available VMs. In some embodiments, VM residence dependency information associated with a service may be used to determine placement of the service at the time the service is deployed As a further example, based on the service dependency information, some services may be started concurrently during deployment, whereas the start up of other services that depend on one or more prerequisite services may be held back until the respective prerequisite services are running or have been started. In some embodiments, resource dependency information associated with a service may be used to determine when the service may be started. As another example, resource dependencies associated with a service may specify when the service may started.

Resource dependency information for a service may specify resources hardware and software that the service is dependent upon. These may include, for example, security compliance parameters, (e.g. firewalling capability, identity and access management, data protection, etc.), disk input-output operations per second (IOPS), etc. Thus, for a first service with explicit service and resource dependencies, the service and resource dependencies may be satisfied prior to starting the first service.

As shown in FIG. 1, exemplary multi-tier application 100 includes three-tiers 150, 160 and 170. Services S3 130 and S4 140 are in a first tier 150, while services S2 120 and S1 110 are in tiers 160 and 170, respectively. Typically, for a multi-tier application if services with no dependencies are considered as being in Tier 1, then services in Tier i for i>1 depend on services in Tier (i−1). A tier i may include one or more services. Tiers may be scalable. Scalability refers to the property by which a tier i (which may be viewed as a cluster of services termed a service cluster) can be instantiated and run concurrently in multiple VMs.

Further, as shown in FIG. 1, service S2 120 depends on services S3 130 and S4 140, while service S1 110 depends on service S2 120. Therefore, based on the dependency information, an initialization sequence for services S1-S4 may be determined. Accordingly, initialization of S2 120 may start after S3 130 and S4 140 have been initialized, and initialization of S1 may commence after S2 has initialized.

Multi-tier cloud based applications are used widely in a variety of areas including e-Commerce, Business-to-Business, Banking and Financial, Retail and Social Networking etc. Each application/class of applications may have different deployment configurations with web servers, application servers and database servers.

Typically, most enterprise multi-tier applications are composed or built from a set of common underlying services. For example, a typical multi-tier web application may include one or more of: front-end cache or web accelerator services (e.g. Varnish etc.) to speed up access to web content; load balancing services (e.g. Nginx ("engine-X"), HAProxy etc.), which may distribute workloads between VMs used by the multi-tier application; application server services (e.g. Tomcat, Jetty, Jboss, Weblogic, Websphere etc), which may serve web pages to end users including web pages that include Java-based web content such as servlets; relational database services (e.g. MySQL, MS SQL Server, Oracle, DB2 etc.), which use Structured Query Language (SQL) to access and manage relational database content; non-relational (or so-called "NoSQL") database services (e.g. Cassandra, Mongo DB etc.), which provide access to variety of non-relational distributed databases, which may include document databases, key-value stores, graph stores such as information about interrelationships between entities, etc.; distributed file systems (e.g. GlusterFS, FhGFS, Lustre etc), which may provide scalable network attached storage (NAS) and/or distribute/aggregate data to/from a plurality of storage servers into a parallel network file system; etc.

Figure 2:
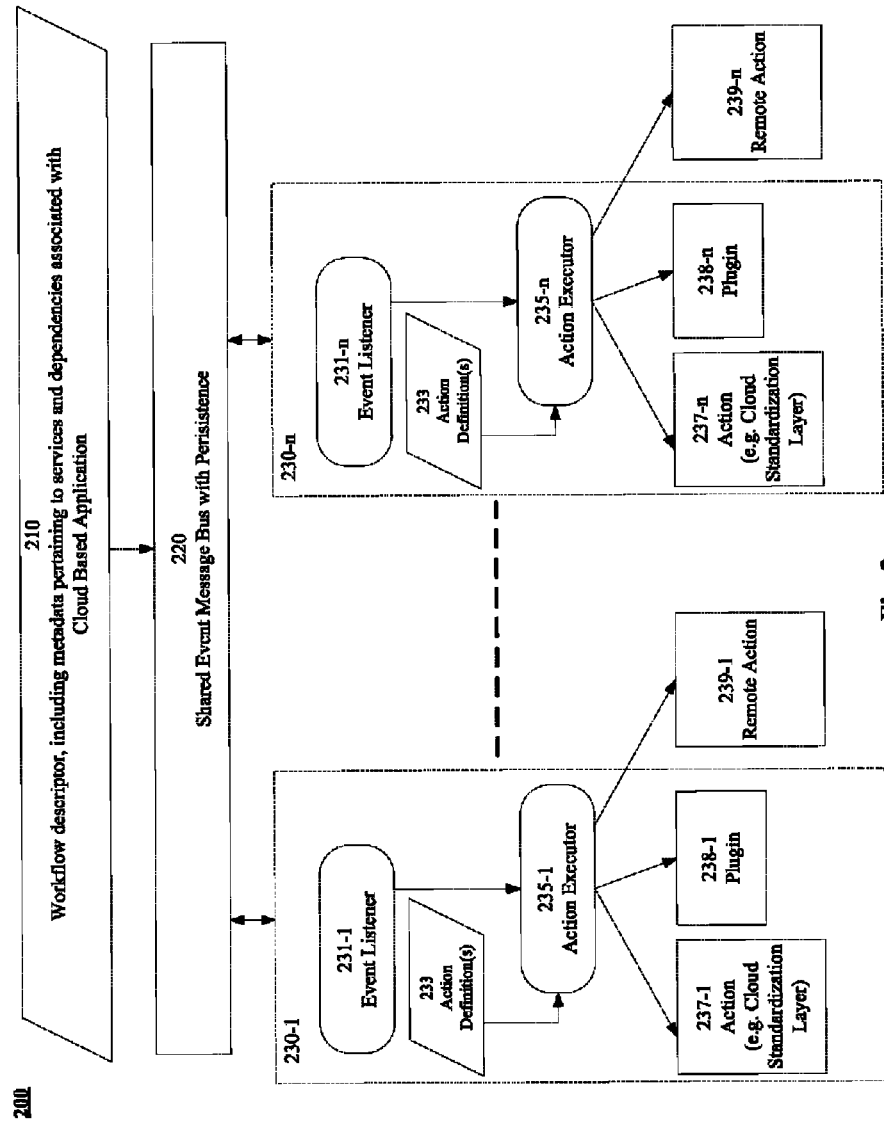
FIG. 2 shows a block diagram of an exemplary architecture for a system for distributed orchestration of cloud based applications in a manner consistent with disclosed embodiments.

FIG. 2 shows a block diagram of an exemplary architecture for a system 200 for distributed orchestration of cloud based applications in a manner consistent with disclosed embodiments. In some embodiments, system 200 may be used, in part, for the distributed orchestration and/or deployment of cloud based applications. In some embodiments, system 200 may form part of a Distributed Orchestration Engine (DOE), which may be distributed across several nodes. In some embodiments, the DOE may operate on a cloud agnostic representation of the distributed computing application.

System 200 may include Shared Event Message Bus with Persistence (SEMB-P) 220, which may obtain Workflow Descriptor 210. In some embodiments, Workflow Descriptor 210 may include metadata pertaining to services, dependencies, and/or lifecycle stages associated with a cloud based application being orchestrated and/or deployed on a cloud. In some embodiments, Workflow Descriptor 210 may be specified using a cloud agnostic representation. The term "persistence" when used in the context of the shared event bus refers to data on the shared event bus that is stored (e.g. in a structure such as a queue in shared memory), available (e.g. simultaneously to nodes coupled to the bus) and may be retrieved by one or more nodes. In some embodiments, SEMB-P 220 may be used for communication and coordination between DOE nodes.

In some embodiments, Workflow Descriptor 210 may include metadata about events pertaining to a cloud based application being orchestrated and/or deployed on a cloud. For example, the event metadata may include data about entry point events, which may trigger the start of a new event associated with an application. For example, a cloud based application may include components and a series of events associated with one or more of the components, where each event may be associated with one or more actions. Workflow Descriptor 210 may include a representation of an ordered set workflows describing a sequence of steps for deploying a cloud based application. Workflows may describe the application topology and may reflect dependencies between components of the application.

In some embodiments, the actions associated with an event may be specified using an event-action map. In some embodiments, the event-action map may be specified in an extensible format and may include a mapping of events to actions. In some instances, the actions in the event-action map may be atomic or built using atomic actions. The term "atomic" when used with "action" is used to refer to actions specified at a level of granularity where the "atomic actions" may be used as building blocks to construct more complex actions and/or re-used in other contexts. Atomic actions facilitate the reuse of actions in a variety of contexts. Actions may also include control operators such as AND, OR, PARALLEL, etc, which may determine which actions are executed (e.g. one of several; all) and how the actions are executed (sequential; in parallel). In some instances, actions may map to one or more additional events, each of which may have respective event action maps.

Further, in some embodiments, Workflow Descriptor 210 may include a "scalable" or "clusterable" descriptor. The clusterable descriptor may specify a minimum (e.g. as shown in and maximum cluster size, which may be used to bound the number of VMs/nodes that a service runs on. For example, a minimum or maximum cluster size may be set for scalable web server service Tomcat 7. When an application with the Tomcat 7 service is launched, the Tomcat 7 service may be dynamically scaled up or down by adding or removing VMs in a range from minimum cluster size to maximum cluster size based on various conditions. For example, the automatic scaling of services may be driven by CPU load policies, load balancer input, VM availability, price-performance ratios, cost considerations, etc.

In general, a user may specify placement/residency and/or co-residency information for a subset of the plurality of components (e.g. services and/or nested applications) in a multi-tier application. The placement or residency information may specify a mapping of components of a multi-tier application to one or more virtual machines for running those components. Co-residency information may specify (i) components that may not be co-resident and/or (ii) components that are to be co-resident on a VM/node when the multi-tier application is deployed. For example, metadata in Workflow Descriptor 210 may specify VM co-residency for services S3 130 and S4 140 (FIG. 1). As another example, residency or placement dependency data for the Tomcat service may specify that Tomcat cannot co reside with a load balancing service. The residency dependency data may be used to ensure that a single VM does not run both Tomcat and a load balancing service.

In some embodiments, the actions associated with an event may be specified in an event-action map, which may specify the actions associated with each event and/or the context or conditions under which one or more of the actions may be performed. For example, the actions associated with an event in an event-action map may be varied based, in part on whether the application is being initialized, terminated, suspended, scaled, upgraded and/or migrated. The term "lifecycle stage" is used to refer to a stage in the configuration, deployment, or running of an application. For example, the lifecycle stage may be one of initialization, termination, suspension, scaling, upgrading and/or migration. The life cycle stage may apply to application(s), to service clusters associated with the application(s), to services, and nodes running the services. For example, actions associated with lifecycle stage related information for a service may include: (i) locations to obtain the service for one or more clouds (e.g. specified using Uniform Resource Locators (URLs)), and/or (ii) start up, restart, initialization and/or stop scripts, (iii) migration scripts, (iv) upgrade scripts, (v) backup and/or (vi) crash recovery scripts, etc. or the locations (e.g. specified using URLs) of the respective scripts thereof.

The term "service cluster" is used to refer to a collection of distributed services, which may be deployed together. Services in the service cluster may be clustered for operational and/or functional reasons, for example, on account of business or technological commonalities. Service clusters may be viewed as an affiliation of services and a combination of their functionalities to solve a business and/or technological problem.

For example, for an initialization lifecycle stage actions may include installation of software packages and specification of initialization and clean up scripts at the node level, which may be performed (e.g. by DOE/system 200) prior to service startup. As another example, during an initialization lifecycle stage, actions may include: (i) automatic downloading of executables for the various services for cloud that the multi-tier application is being deployed on; (ii) configuration of the multi-tier application and component services based on the specified properties; and (iii) starting, in a sequence conforming to specified dependencies in Workflow Descriptor 210, component services of the multi-tier application.

In some embodiments, an entry point event, which may be associated with one or more additional events, may be used to signal that prerequisites for the launch of the one or more additional events have been satisfied. When the prerequisites for the launch of the one or more additional events have been satisfied (which may be indicated by the entry point event), the one or more additional events may be launched.

Thus, in some embodiments, Workflow Descriptor 210 may be viewed as an ordered set of events associated with a cloud-based application where each event may be associated with a set of event-action maps, where each event-action map in the set may be associated with a distinct lifecycle stage.

In general, at an application level, Workflow Descriptor 210 may facilitate representation of lifecycle stage attributes for event action map storage and persistence, and attributes supporting listener capabilities for event observers. For example, for a multi-tier application such as exemplary multi-tier application 100, Workflow Descriptor 210 may specify events at the application level. The events at the application level may be associated with a first event-action map. For example, referring to FIG. 1, a first event action map may point to services S1 110, S2 120, S3 130 and S4 140. Further, in the example above, a second event action map, which may be associated with S2 120, may have a pointer to a service cluster given by S3 130 and S4 140.

In general, one or more tiers (e.g. 150, 160 or 170) within an application may be associated with a cluster. The event action map associated with a cluster may specify dependencies related to the cluster at a lifecycle stage of the cluster. For example, when a cluster is initialized, dependent clusters may be notified of the initialization using appropriate entry point events. In addition, a third event action map associated with a cluster (e.g. service cluster S3 130 and S4 140) may include pointers to additional services. A fourth event action map associated with one of the additional services may have pointers to one or more nodes. A fifth event action map associated with the one of the nodes may serve, at least in part, to define a VM running the service. Thus, event action maps for a multi-tier application may form a hierarchy. The event action maps at each level of the hierarchy may have pointers to other event action maps. The specific event action map invoked may depend on a current lifecycle stage of the invoking component.

As one example, an application lifecycle, which may have multiple lifecycle stages, may be viewed as comprising one or more cluster lifecycles. The cluster lifecycle may be viewed as comprising one or more service lifecycles. The service lifecycles, in turn, may comprise one or more node lifecycles.

In some embodiments, events in Workflow Descriptor 210 may be placed on SEMB-P 220. For example, the events may be placed in a queue or another ordered list. In some embodiments, SEMB-P 220 may be implemented using a variety of shared message buses supporting persistence. In general, any message queue based protocol over a message bus may be used to implement SEMB-P 220. For example, in one implementation, MongoDB, which provides file system functionality and supports data replication across nodes, may be used to implement SEMB-P 220. In some embodiments, one or more events may be placed on SEMB-P 220 when the events are ready for execution. The term "ready for execution" indicates satisfaction of prerequisites for execution of the event.

System 200 may include distributed nodes 230-1 through 230-n, which may be coupled to SEMB-210. In some embodiments, nodes 230-1 through 230-n may be part of a DOE. In some embodiments, exemplary DOE node 230-i may include Event Listener 231-i and Action Executor 235-i, for 1≤i≤n. For simplicity and ease of description, the operation of nodes 230 has been described below with respect to Node 230-1.

In some embodiments, Event Listener 231-1 may listen on SEMB-P 220 to monitor the event queue for an indication of one or more events that are ready for execution. Upon receiving an indication that one or more events are ready for execution, DOE node 230-1 may select an event at the top or head of event message queue for further processing. In some embodiments, after selecting an event, DOE node 230-1 may remove the event from the top of the event message queue and/or place a message on SEMB-P 220 indicating that the event is being processed. In some embodiments, SEMB-P 220 may be locked by DOE node 230-1 during selection to prevent conflicts and race conditions with other DOE nodes. In some embodiments, a priority scheme, round-robin approaches, load balancing criteria etc may be used in a distributed fashion by nodes to autonomously determine whether they may select an event for further processing. For example, each DOE node 230-i may use some user-specified or system criteria related to its current or predicted workload etc to determine when to select an event for processing.

In some embodiments, metadata pertaining to the selected event in Workflow Descriptor 210 may be passed to Action Executor 235-1. Action Executor 235-1 may look up Action Definition 233 to determine an action associated with the event being processed. In some embodiments, the action may be based, in part, on the lifecycle stage associated with the event being processed. Based on the action information, Action Executor 235-1 may execute the action locally or remotely. In some embodiments, events associated with Workflow Descriptor 210 may be used to orchestrate an application through various stages of the application lifecycle.

As one example, a "stop application" event may be used, for example by DOE, when termination of an application is desired. In some embodiments, metadata related to the example "stop application" event may be obtained from Workflow Descriptor 210, placed on SEMB-P 220, and may be selected for further processing.

For example, referring to FIG. 2A, Event listener 231-i on an available node 230-i (e.g. a relatively lightly loaded node or the next node in turn) may detect the presence of "stop application" event on SEMB-P 220 at the top of the event queue and may select "stop application" event for further processing.

Next, the selection of the stop application event for processing may be indicated, for example, by removing the message from the top of the event message queue. For example, after selecting stop application event 253, Event listener 231-i/DOE node 230-i may remove the event from the top of the event message queue and/or place a message on SEMB-P 220 indicating that the event is being processed. As outlined above, event listeners 231 may listen on SEMB-P 220 and select events from the top of event queue, which may then be acted upon by a corresponding Action Executor 235. For simplicity and ease of description, the actions of event listeners 231 have been omitted from the discussion below.

Based, in part, on the current lifecycle stage of the application, one or more actions associated with the Stop Application event may be obtained from an event-action map associated with the application and/or event. For example, if the cloud-based application is not in a "running", "started", or other valid state, an error may be indicated and an appropriate error handler may be invoked or a message/event may be placed on SEMB-P 220.

In some embodiments, an event-action map associated with the application, which may include action definitions associated with events and corresponding to a current lifecycle stage of the application, may be available and/or, may have been made available to one or more nodes 230-i: (i) at the time the application was deployed; or (ii) at the time the application changed state—such as transitioning from one lifecycle stage to another. Continuing with the example above, a lifecycle/current lifecycle stage associated with the application to which "stop application" event is being applied may then be obtained, if not previously available to the DOE.

In instances, where the application comprises one or more service clusters and the application is in a valid lifecycle stage, the "stop application" event may resolve to a "stop cluster" event, which may be triggered on the service clusters associated with the application.

Next, in the example above, the current lifecycle stage of each service cluster associated with the application may be determined. For example, the "stop cluster" event may be applicable to service clusters associated with the application, which are in a "running" lifecycle stage. If a service cluster associated with the application is not in the "running" lifecycle stage, then the "stop cluster" event may not be applied to that service cluster. Accordingly, in some embodiments, for service clusters associated with the application, which are in the "running" lifecycle stage, an Action Executor 235 may resolve the "stop cluster" event to an action such as, for example, "lifecycle_action_cluster_stop" obtained from a corresponding Action Definition 233.

The "lifecycle_action_cluster_stop" action, in turn, may lead to the invocation (e.g. by the DOE) of cloud-specific operations leading to termination of each of the nodes corresponding to the service cluster associated with the application. For example, the operations may include a "terminate node" event for each node to be terminated, which may be placed on SEMB-P 220.

Further, in the example above, Action Executor(s) 235 corresponding to DOE node(s) 230 may resolve the "terminate node" event to a corresponding action, such as, for example, a "lifecycle_action_node_terminate" action, which may terminate the node and place a "node stopped" event on SEMB-P 220. Further, "lifecycle_action_node_terminate" action may cause a "stop service" event to be placed on SEMB-P 220.

In the example above, "stop service" event may resolve to a "lifecycle_cluster_state_change_wait" action, which may wait till all the nodes (and hence services) associated with the cluster have been terminated. When all the services are terminated, a "service stopped" event may be placed on the SEMB-P 220.

The "service stopped" event, which may be processed based on the event-action map associated with the service cluster, may resolve two actions executed sequentially: (i) "lifecycle_action_evict_storage_cache", which clears the cache, and (ii) "lifecycle_action_common_send_status_update", which waits till all the service clusters associated with the application have been terminated, and places a "cluster stopped" event on SEMB-P210.

The "cluster stopped" event, which may be processed based on the event-action map associated with the application and result in the termination of the application by invocation of the appropriate actions. When the application has been terminated, a "stopped application" event may be placed on SEMB-P 220 indicating that the application in the example above has been terminated.

In some embodiments, the execution of actions may occur in parallel (unless specified otherwise) and in some instances, may not be dependent on the state of other nodes executing the actions. For example, for the "terminate node" event may trigger the "node stopped" and "service stopped" events, and actions corresponding to the "node stopped" and "service stopped" events may be executed on the appropriate nodes in parallel without regard to the state of the other nodes in the service cluster. However, coordination of actions at a higher level in the hierarchy may continue to occur. For example, as outlined above, the "lifecycle_cluster_state_change_wait" action may wait till all the nodes associated with the service cluster have been terminated.

In some embodiments, based, in part, on the action specified in Action Definition 233, Action Executor 235-1 may invoke Action 237-1 on the cloud. For example, when Action Definition 233 is specified in a cloud agnostic fashion, then, Action 237-1 may invoke a Cloud Standardization Layer associated with the cloud to execute the action through a script/program and/or to provision or configure cloud resource on the cloud. In some embodiments, Action Executor 235-1 may initiate the execution of the script (e.g. through a Cloud Standardization Layer) using a secure container based sandbox. A sandbox refers to a security mechanism for separating running programs. A container refers to an isolation unit or environment within a single operating system specific to a running program. When executed in their respective secure container based sandboxes, one or more programs or scripts may run efficiently on a single VM using operating system virtualization, which facilitates rebooting, provision of IP addresses, separate memory, processes etc. to the respective containers. Secure container based sandboxes provide resources to efficiently run programs/scripts without instantiation of an entire VM.

In some embodiments, where new endpoint based services are being added, VMs may not be launched for service endpoints when a multi-tier application that includes the endpoint based service is deployed. For example, for a multi-tier application with an external service endpoint (e.g. such as Amazon RDS), which may be provided in the form of a PaaS, no VMs may be launched when the multi-tier application that includes the endpoint based service is deployed. Action Executor 235-1 may invoke a cloud-specific plugin to interface with the endpoint based service. As one example, plugins may be used for logging events, obtaining metrics, log management, etc. As another specific example, off the shelf services to perform one or more functions (e.g. "Sumo Logic") may be integrated into an event-action framework. For example, "Sumo Logic", which is an off the shelf service for cloud-based log management and analytics, may be integrated into the event-action framework using an associated Java archive ("jar") file that may be resident on the node. Events from the event-action framework may be mapped to functions and/or actions in the "sumo logic" application based, in part, on the contents of the jar file.

In some embodiments, Action Executor 235-1 may initiate the remote execution of an action in a VM through an agent in the VM. For example. Action Executor 235-1 may communicate securely with a management agent in the VM to remotely execute the script.

Although the description above was with reference to Node 230-1, it should be understood that description may also be applicable to one or more other nodes 230 in system 200. For example, DOE node 230-n may process events in a manner similar to node 230-1 using Event Listener 231-n and Action Executor 235-n, which may initiate execution of one of Action 237-n, Plugin 238-n, or Remote Action 239.

Figure 3:
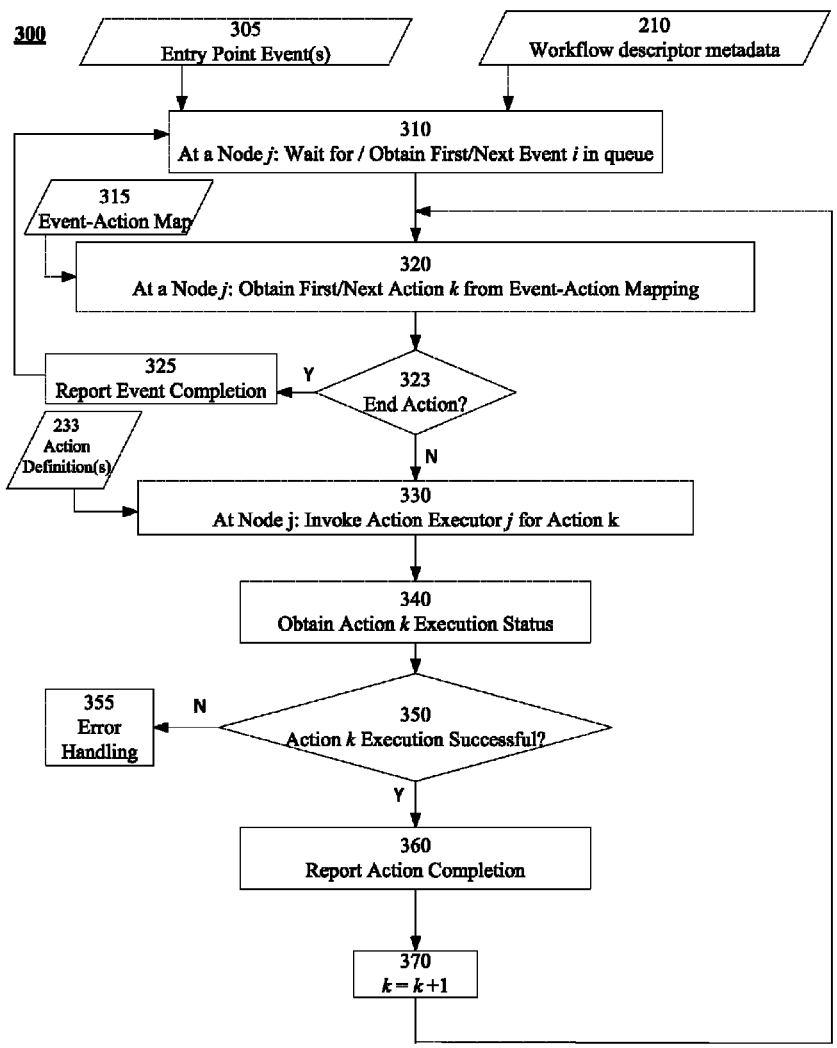
FIG. 3 shows a flowchart of an exemplary method for distributed orchestration of a cloud based application, as performed by a single node in a DOE that includes a plurality of nodes, in a manner consistent with disclosed embodiments.

FIG. 3 shows a flowchart of an exemplary method 300 for distributed orchestration of a cloud based application, as performed by a single node in a DOE that includes a plurality of nodes, in a manner consistent with disclosed embodiments. Method 300 may be also executed for other events associated with the cloud based application by other nodes in the DOE. In some embodiments, DOE nodes 230-j ($1 \leq j \leq n$) may execute method 300 for distinct events in the event message queue in parallel. In some embodiments, method 300 may be performed by a plurality of processors in a cloud based virtualized environment.

In block 310, at a DOE Node j, the first or next event i at the top of event message queue may be obtained or selected. For example, based, in part, on a representation of a cloud-based distributed computing application, which may include a plurality of components, an ordered set of events may be obtained based on an execution sequence for the plurality of components. Each event in the ordered set may be associated with a corresponding set of prerequisites for initiating execution of the event. An event from the ordered set may be at the head of the event message queue on SEMB-P 220 when prerequisites in a corresponding set of prerequisites for initiating execution of the event have been satisfied. For example, based on Workflow Descriptor 210 and an entry point event 305, DOE Node j may receive an indication and/or determine that prerequisites for initiating execution of the event i (which may at the top of the event message queue) have been satisfied.

In some embodiments, Workflow Descriptor 210 may include metadata pertaining to services, dependencies, and/or lifecycle stages associated with a cloud based application being orchestrated and/or deployed on a cloud. For example, the lifecycle stages may be one of: startup, shutdown, scaling, migration, backup, upgrade or recovery. In some embodiments, the ordered set of events and the set of prerequisites for initiating execution of an event may be obtained based, in part, on a lifecycle stage associated with components of the cloud based distributed computing application. In some embodiments, Workflow Descriptor 210 may be specified using a cloud agnostic representation of the cloud based distributed computing application.

For example, in some embodiments, in step 310, dependency information in Workflow Descriptor 210 and/or Entry Point event 405 may be used to determine that the event i at the top of event message queue is ready to be processed. In some embodiments, Workflow Descriptor 210 may include one or more of: application topology metadata for the cloud-based distributed computing application including dependency metadata for a plurality of components of the cloud-based distributed computing application; configuration metadata for the plurality of components of the cloud-based distributed computing application; or lifecycle stage metadata for components of the cloud-based distributed computing application.

In some embodiments, upon selecting event i ready for execution, DOE Node j may provide an indication of the selection of event i. For example, an event identifier corresponding to the selected event i ready for execution may be appropriately marked, which may provide an indication that the event associated with the marked event identifier is unavailable for selection by another DOE node.

In some embodiments, the selection of the event ready for execution may be performed by node j, based, at least in part, on the current workload of the node j relative to the workload of some subset of nodes in the plurality of distributed nodes that comprise the DOE.

In step 320, based on information in event-action map 315, the first or next action k corresponding to the event i may be obtained by DOE Node j. In some embodiments, the event-action map 315 obtained may be based, in part, on a current lifecycle stage associated with the cloud-based application/event.

In some embodiments, in block 323, action k is checked to see whether it is an "end" action. An "end" action may be used to signal the end of an action sequence. In some embodiments, if action k is an end action ("Y" in block 323), then, in block 325, the completion of event i associated with the action sequence is reported and the method returns to block 310 where the next event is awaited. In some embodiments, a message or reporting event may be placed on event message bus to inform other DOE nodes of completion of event i. In some embodiments, upon receiving an indication of completion of one or more executed events on SEMB-P 220, one or more additional events that are ready for execution may be determined based on the received indication of completion of the one or more executed events. For example, the completion of an event may result in prerequisites associated with one or more other events to be satisfied thereby transitioning the one or more other events to a "ready for execution" state.

If action k is not an end action ("N" in block 323), then, in step 330 Action Executor j on DOE node j may be invoked. In step 330, Action Executor j on DOE Node j may be used to initiate the execution of an action associated with the event i. In some embodiments, the action to be executed may be obtained, based in part, on information in event action map 315. In some embodiments, the action may be executed using a Cloud Standardization Layer associated with the cloud, using a plugin, through a secure container based sandbox, using scripts interfacing with an endpoint based service, invoking functionality provided by an off-the-shelf service, and/or remotely by secure communication with an agent on the cloud.

In block 340, the execution status of action k may be obtained. In block 350 the execution status of action k obtained in block 340 may be used to determine if action k completed successfully. If action k completed successfully ("Y" in block 350), then, in block 360, the completion of the action k may be reported. In some embodiments, a message or reporting event may be placed on event message bus to inform other DOE nodes of completion of action k associated with event i. In step 370, k may be incremented and the method returns to step 320 to process the next action associated with event i.

If action k did not complete successfully ("N" in block 350), then, in block 355, Error Handling may be performed. Error Handling routine 355 may specify corrective actions (which may, in some instances, form part of action k), or may terminate action k and report the failure appropriately (e.g. by placing an event message on the event message bus). For example, in some embodiments, action k and other actions associated with event i may be rolled back and event i may be marked as available and placed back as an active to be processed event on the event message bus. In some embodiments, the use of "atomic" events may simplify rollback by limiting the complexity of events.

Method 300 is merely exemplary and illustrative and various modifications are envisaged as would be apparent to one of ordinary skill in the art. In general, method 300 may be performed by a DOE comprising one or more DOE nodes. In some embodiments, one or more actions in an event-action map 315 may generate one or more additional events, which may be placed on SEMB-P 220 and processed by one or more DOE nodes in a manner similar to the description above.

In some embodiments, Workflow Descriptor 210 may be described in a cloud agnostic manner and cloud specific implementations of various actions may be obtained using a cloud standardization layer. In some embodiments, method 300 may be used to facilitate the distributed orchestration and deployment of cloud based multi-tier applications, including applications represented in a cloud agnostic manner. For example, Workflow Descriptor 210 may describe dependencies and other metadata based on or obtained from a cloud agnostic representation of an application (e.g. a multi-tier application) and the cloud agnostic representation of the application. In some embodiments, in part, because of the absence of cloud specific information in the cloud agnostic representation of the application, the DOE may be used to orchestrate and deploy the application seamlessly on a plurality of clouds. Thus, the need for expensive resource intensive cloud application orchestration and deployment is obviated.

The term "cloud agnostic representation" is also used to refer to a representation of an application that does not include parameters, instructions or other information that are specific to any one cloud. Because cloud agnostic representations do not include information that is cloud-dependent, the cloud agnostic representation may be deployed to a plurality of clouds in a manner consistent with embodiments disclosed herein. For example, in contrast to conventional applications, which may: (i) be designed to run on a specific cloud using cloud specific orchestration; and (ii) require labor intensive and expensive modifications to the program code prior to orchestration and/or deployment on another cloud; the cloud agnostic representation may be seamlessly deployed to a plurality of clouds.

In some embodiments, a cloud agnostic representation of a cloud based application (e.g. a cloud based multi-tier application) may include cloud agnostic Workflow Descriptors 210 in the form of metadata. The cloud-independent or cloud-agnostic metadata may be obtained based, in part, on cloud-agnostic application metadata 237 and/or from a user-specified cloud agnostic application profile.

Workflow Descriptor 210 may also include application metadata (which may be at an application level) for a cloud based application. In some embodiments, the application level metadata may include global information about the application as a whole (which may be composed of components) such as dependency metadata between application components, configuration information and lifecycle stages, including startup, shutdown, scaling, migration, backup, upgrade etc. In some embodiments, Application metadata may include information/scripts for orchestration an application, a preferred hardware configuration for the application, etc. In general, application metadata may include pointers to some or all of the underlying metadata associated with components of a multi-tier application being modeled.

For example, during an application migration lifecycle stage, DOE/system 200 may be used to migrate an application from a first cloud to a second cloud. The application may be migrated: (i) live, if the application supports simultaneous multi-cloud provisioning, or (ii) during application downtimes. For example, the event-action map for the application in the migration lifecycle stage may include: (i) a shutdown event and (ii) a backup event to a storage repository on the cloud running the application. Upon completion of the shutdown and backup, a DOE node on the source cloud may then initiate (iii) a file-sync event, which may move the backup to a storage repository on the target cloud. Upon completion of the file sync event, a DOE node on the source cloud may communicate with a DOE node on the target cloud to initiate orchestration using a restore lifecycle stage. The DOE node on the target cloud may then deploy the application based on events and event action maps associated with the application for the restore lifecycle stage. Thus, DOE nodes associated with the orchestration of an application on one cloud may remotely communicate securely with a DOE node associated with the application on another cloud to perform/coordinate orchestration tasks. Applications may be migrated, for example, as part of a planned migration to another cloud, because of cloud pricing, performance, cloud availability and/or for other reasons. In some embodiments, because of the cloud agnostic representation of the cloud based application, the application may be seamlessly migrated after execution of any specified migration related scripts.

Dependency metadata 233 may include dependency information for application components in a cloud based application being orchestrated and/or deployed. For example, the dependency information for a first component (e.g. S2 120 in FIG. 1) of a multi-tier application being orchestrated may specify one or more other multi-tier application components that the first component may depend upon (e.g. S3 130 and S4 140 on which S2 depends). Dependency metadata may also include information related to co-residency of components of the multi-tier application being orchestrated and/or deployed.

For example, referring to FIG. 1, the dependency metadata may specify VM co-residency S3 130 and S4 140. Further, the SEMB-P (FIG. 2) queue may hold S4-S3-S2-S1. Accordingly, during orchestration of cloud based application 100 in a startup lifecycle stage, a DOE node may first use an event associated with S4 140, which may be at the top of the shared event message queue to initiate and start and S4 140. When S4 140 is marked for processing by a node, S3 130 may move to the top of the shared event message queue. Next, the same or another DOE node may simultaneously initiate the startup of S3 130 on the same VM as S4 140 (e.g. based on the co-residency dependency data). Upon completing the startup of S4 140 and S3 120, one or more events may be placed on SEMB-P 220 (FIG. 2) to indicate that startup of S3 130 and S4 140 has been performed/completed. The event(s) indicating that the startups of S3 130 and S4 140 have completed successfully may serve as an entry point event for the startup of S3. A DOE node may now mark S2 120 for processing and S1 110 may move to the top the shared event message queue.

Thus, the dependency metadata associated with services or components of a cloud based application (as reflected in the metadata for cloud agnostic representation of the application) may be used to determine a sequence for start up, initialization and/or a deployment configuration (e.g. VM co-residency and/or VM placement) of the services when the cloud based application is deployed.

Service configuration metadata in Workflow Descriptors 210 may include generic information about a service such as name, version, service type, capabilities, service parameters etc. For example, for a Tomcat service, the generic information may include the service name "Tomcat", version "6.0", service type "Java Web Server", etc. Service configuration metadata information for a service may also include Virtual Machine co-residency information for the service and dependency rules specific to the service. For example, dependency data for the Tomcat service above may specify that it depends on one or more of a database service, frontend and/or backend cache service etc. Further, the dependency metadata may specify that Tomcat cannot co-reside with a load balancing service.

In some embodiments, the service configuration metadata associated with a service may include information about the service such as configuration information and service lifecycle stage attributes (e.g. startup, shutdown, scaling, migration, backup, upgrade, restore etc). Each lifecycle stage may be associated with specific information/scripts/actions for the service, a preferred hardware configuration, etc. For example, lifecycle stage service configuration metadata may specify service lifecycle related information such as one or more locations to: (i) obtain the service for one or more clouds, (ii) obtain start up, restart, initialization and/or stop scripts, (iii) migration scripts, (iv) upgrade scripts, (v) backup and/or (vi) crash recovery scripts, etc. In some embodiments, the locations may be specified using Uniform Resource Locators (URLs).

Further, in some embodiments, service configuration metadata may include a "scalable" or "clusterable" descriptor. The clusterable descriptor may specify a minimum (e.g. as shown in and maximum cluster size, which may be used to bound the number of VMs/nodes that the service runs on. For example, a minimum or maximum cluster size may be set for scalable web server service Tomcat 7. When an application with the Tomcat 7 service is launched a runtime GUI may be provided to dynamically scale the application up or down by adding or removing VMs in a range from minimum cluster size to maximum cluster size. For example, the automatic scaling of services may be driven by CPU load policies, load balancer input, VM availability, price-performance ratios, cost considerations, etc.

Service configuration metadata in Workflow Descriptor 210 may specify placement/residency and/or co-residency information for a subset of the plurality of components, services and/or applications in a multi-tier application. The placement or residency information may specify a mapping of components of a multi-tier application to one or more virtual machines for running those components. Co-residency information may specify (i) components that may not be co-resident and/or (ii) components that are to be co-resident on a VM/node when the multi-tier application is deployed.

In some embodiments, the cloud agnostic representation 290 of multi-tier application may include a representation of application metadata 237 and/or system and pattern primitives, which describe the execution pattern and dependencies. In some embodiments, using events and event-action maps obtained from a single cloud agnostic representation the cloud based application (e.g. multi-tier application) may be orchestrated and deployed on one or more distinct clouds.

Figure 4:
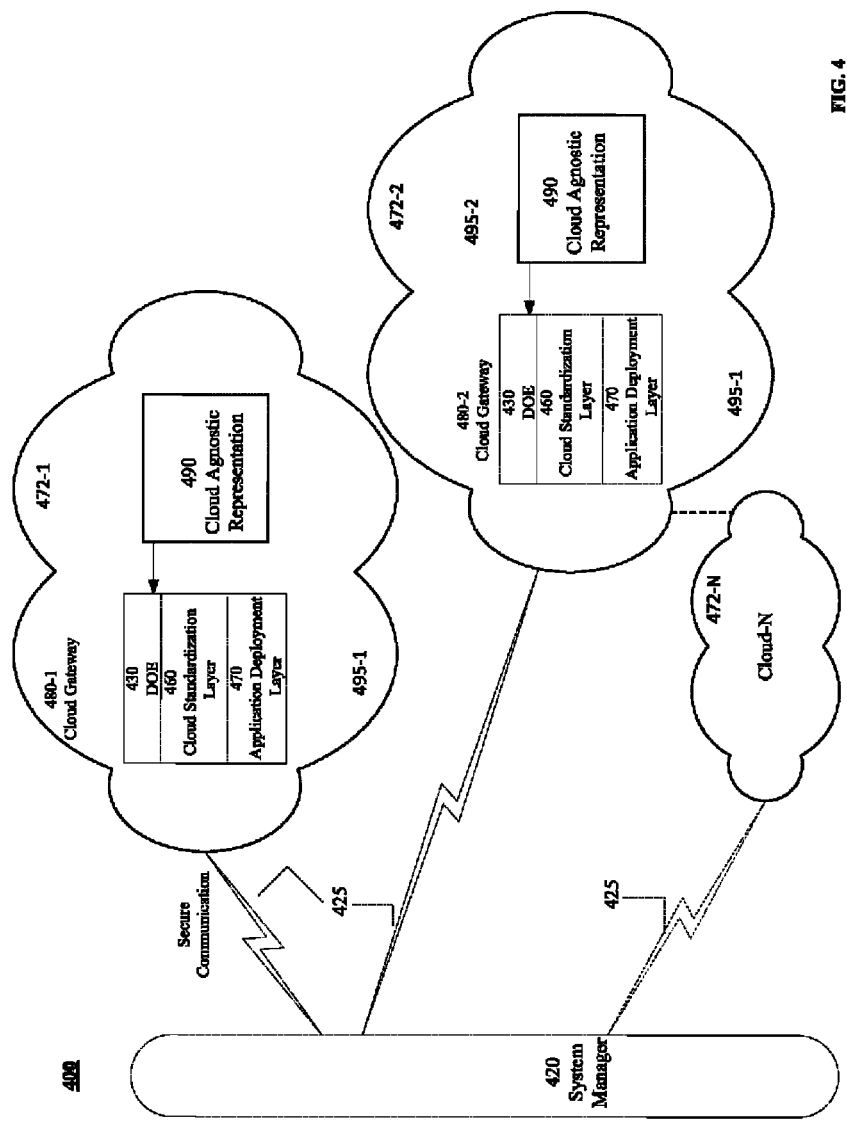
FIG. 4 shows an exemplary system for distributed orchestration and deployment of cloud agnostic representations of a cloud based application on a plurality of clouds in a manner consistent with disclosed embodiments.

FIG. 4 shows an exemplary system 400 for orchestration and/or deployment of cloud agnostic representations of a cloud based distributed computing application on a plurality of clouds in a manner consistent with disclosed embodiments.

System 400 shown in FIG. 4 is used merely exemplary and is used to illustrate the operation of some disclosed embodiments. Techniques and embodiments disclosed may also be used in conjunction with various other cloud-based architectures and/or distributed computing systems. As shown in FIG. 4, system 400 may include System Manager 420, Distributed Orchestration Engine (DOE) 430, Cloud Standardization Layer 460, Application Deployment Layer 470, and Cloud Gateway 480.

System 400 may also include one or more clouds, which are shown as Clouds 472-1, 472-2 . . . 472-N and collectively referred to as Clouds 472. Clouds 472 may communicate with at least one System Manager 420 using communication links 425. Communication links 425 may permit secure communication between System Manager 420 and one or more of DOE nodes 430, Cloud Standardization Layer 460, Application Deployment Layer 470, and/or Cloud Gateway 480. System Manager 420 may be in communication with one or more clouds 472-$i$ at any time.

In some embodiments, system 400 may also comprise cloud agnostic representations 490 of a cloud based distributed computing application. In some instances, the cloud based distributed computing application may be a multi-tier application. Cloud agnostic representation 490 may be used to obtain a cloud specific implementation of the multi-tier application. For example, cloud agnostic representation 490 of a multi-tier application may be used to obtain a cloud specific implementation for Cloud 472-1 and another (different) cloud specific implementation of the multi-tier application for cloud 472-2. System 400 may facilitate orchestration and deployment of cloud agnostic representations 490 of a cloud based distributed computing application in a manner consistent with disclosed embodiments.

In some embodiments, System Manager 420 may manage application topology information and coordinate with DOE nodes 430. System Manager 420 may obtain a user-specified or predefined application profile. In some embodiments, Workflow Descriptors 210 (not shown in FIG. 4) may be obtained based, in part, on the application profile. In some embodiments, cloud agnostic representation 490 may be obtained based, in part, on information in the application profile and Workflow Descriptors 210 may be obtained from cloud agnostic representation 490. For example, System Manager 420 may receive, maintain, and update dependency and configuration information, cloud information, application related information (e.g. application profile) and other data such as job history, policies, etc. in an application profile, which may be stored in a cloud agnostic form in cloud agnostic representation 490. In some embodiments, System Manager 420 may also facilitate: user views of application files and data on shared storage, movement of application files and data to cloud storage, and functionality to synchronize the application files and data between clouds. In some embodiments, System Manager 420 may serve as a storehouse and manager of information pertaining to user activities. For example, System Manager 420 may act as a management layer to initiate and manage application deployment and monitoring activities.

In addition System Manager 420 may also manage automated tasks, which, in some embodiments, may have been initiated by DOE 430 and/or one or more nodes of DOE 430 (hereinafter termed "DOE 430"). System Manager 420 may also call or invoke functions implemented by DOE 430 in order to perform various system related activities. In some embodiments, System Manager 420 may maintain a relational database or data repository with information pertaining to system users including user authentication and authorization information; a list of clouds (472-1, . . . 472-N) and available cloud configurations for each cloud 472-$i$; information pertaining to applications/entities; policies that a user may have specified, etc. The information available to System Manager 420 may be provided on demand to DOE 430 and/or stored as part of cloud agnostic representation 490.

In some embodiments, DOE 430 may use a common application representation, such as cloud agnostic representation 290 of a multi-tier application, to deploy and run a given multi-tier application on any cloud, irrespective of implementation differences pertaining to the provisioning and utilization of application resources on the individual clouds, in part, by using functionality provided by Cloud Standardization Layer 460.

In some embodiments, DOE 430 may facilitate the deployment, running, and monitoring of applications on various clouds. For example, DOE 430 may dynamically launch cloud agnostic representations 290 of a multi-tier application on a selected cloud 472-$i$ for multi-tier application execution in response to an execute command entered by a user.

In some embodiments, DOE 430 may facilitate orchestration and deployment of cloud based distributed computing applications without interfering with or adding performance overhead to application execution. Accordingly, in some embodiments, cloud based distributed computing applications may be run directly and natively on the cloud infrastructure. In some embodiments, based, in part, on input provided by DOE 430 and Cloud Standardization Layer 460, Application Deployment Layer 470 may select resource and performance efficient cloud specific implementation for a cloud 472-$i$ ($1 \le i \le N$), DOE 430 may also maintain routines and other program code that implement algorithms for deploying, optimizing, managing and monitoring application runs on clouds. In some embodiments, routines and other functions performed by DOE 430 may be managed and initiated by the System Manager 420 based on an application profile and other user defined criteria, which in some instances, may be embodied in Cloud Agnostic Representation 490. DOE 430 may also report the status and results of the various orchestration activities to System Manager 420. In one embodiment, DOE 430 may directly query System Manager 420 for information such as application data, policies, and cloud information.

Tasks performed by DOE 430 on Clouds 472 may be facilitated by Cloud Standardization Layer 460. For example, functionality provided by Cloud Standardization Layer 460 may permit DOE 430 to use infrastructure independent representations of application code, such as cloud agnostic representation 290 of a multi-tier application, to deploy multi-tier applications. In some embodiments, the infrastructure independent or cloud independent or cloud agnostic program code may be common across all clouds 472 because Cloud Standardization Layer 460 may use Application Deployment Layer 470, which may comprise cloud specific Plugins, APIs and Cloud Specific Libraries, to perform tasks for DOE 430 on any given cloud 472-*i*. In some implementations, the deployment and running of applications and the dynamic management of clusters and other cloud resources may be facilitated by Cloud Application Deployment Layer 470.

In some embodiments, the dynamic management of VMs, clusters and other cloud resources may be facilitated by using a node management service running on a "cloud coordinator/gateway" or "cloud gateway" or gateway 480 for a specific cloud 472-*i*. Gateway 480 may also maintain Cloud APIs and Cloud specific Libraries.

In some embodiments, Cloud Standardization Layer 460 may include functionality to facilitate standardization of library constructs (such as shared storage, network, cluster, security, etc.) across a variety of cloud providers. Although cloud providers may have provider-specific Application Programming Interfaces (APIs) and other infrastructure differences, Cloud Standardization Layer 460 may provide applications a cloud agnostic or a cloud infrastructure-independent view of resources, including compute, storage and network resources. For example, Cloud Standardization Layer 460 can be a repository for various functional modules that permit applications to utilize various resources (including shared storage, server types, clusters and features such as queues, security, etc.) on each cloud in a cloud-agnostic manner.

In some embodiments, Cloud Standardization Layer 460 may maintain resource standardizations for various clouds, such as exemplary clouds 472-1, 472-2 . . . 472-N, as well as references to cloud-specific implementations of the standardizations for clouds 472. In some embodiments, exemplary Cloud Standardization Layer 460 may also maintain service-level agreements (SLAs), capability information about each cloud resource, information pertaining to cloud availability, reliability, and security, and performance and pricing information. Information may be maintained by Cloud Standardization Layer 460 by using metadata XML files or databases, which, in some implementations, may be persistent. In some implementations, the capability information can be stored as {key, value} pairs in a database. Because individual clouds may have different capabilities for a standardized resource type, capability information may be indexed by cloud.

In some embodiments, the cloud agnostic application representation 490 may be common to a plurality of clouds and the application may be deployed on a specific cloud using cloud standardization layer 460. For example, the cloud agnostic application representation 490 may take the form of application descriptors (not shown) such as pattern and system primitives, which may be input to DOE 430. The pattern and system primitives may describe the execution patterns as well as node, storage, communication and network characteristics pattern and system primitives. Exemplary application descriptors can include information such as: application software and hardware requirements, application profile (whether memory intensive, Input-Output intensive, CPU intensive, etc.), specification of a distributed computing paradigm, application steps (for workflow style applications).

Cloud Specific Libraries and Cloud APIs may comprise a library of implementations for primitives and composite interfaces, respectively, for a specific cloud 472-*i*. In some embodiments, Cloud APIs and Cloud Specific Libraries may be invoked using Cloud Plugins. For example, Cloud Plugins may be used to invoke appropriate Cloud APIs and routines from Cloud Specific Libraries that permit the deployment and running of applications on Clouds 472, where the applications may have been described using application descriptors and standardized primitives from Cloud Standardization Layer 460.

In some embodiments, when an application is to be deployed, a gateway 480-*i* may use Cloud APIs and Cloud Specific Libraries to perform deployment and execution tasks for cloud 472-*i*. For example, shared storage primitives on Cloud Standardization Layer 460 may lead to instantiation of a DFS shared storage implementation on an Amazon™ cloud, while instantiating the shared storage implementation on a Terremark™ cloud will set up NAS/SAN.

In some embodiments, gateway 480-*i* may also launch one or more agents (not shown), which can be deployed on Cloud 472-*i*. In some embodiments, functionality specified or configured by the user may be implemented by gateway 480, DOE 430, and/or Cloud Application Deployment Layer 470, which, in some implementations, may include software agents running on the various clouds 472. These software agents may monitor application runtime statistics, collect cloud related information such as but not limited to cloud load information, pricing information, security information etc., and/or collect information related to VMs and/or user actions.

In some embodiments, the agents may report the actions performed as well as other task status back to gateway 480-*i*, DOE 430 and/or System Manager 420. For example, in one embodiment, the agent(s) may monitor, collect and/or remove cloud specific VM information (such as cloud initialization and/or other cloud-specific configuration actions) selectively when a VM is launched on a first cloud 472-1 and may report the collected information to one or more of gateway 480-*i*, Cloud Standardization Layer 460, DOE 430 and/or System Manager 420.

In some embodiments, information including actions, status and statistics obtained and reported by an agent may be used by DOE 730 to determine orchestration actions. In some embodiments, the information obtained/reported by an agent may result in one or more events of SEMB-P 220 (not shown in FIG. 4).

Figure 5:
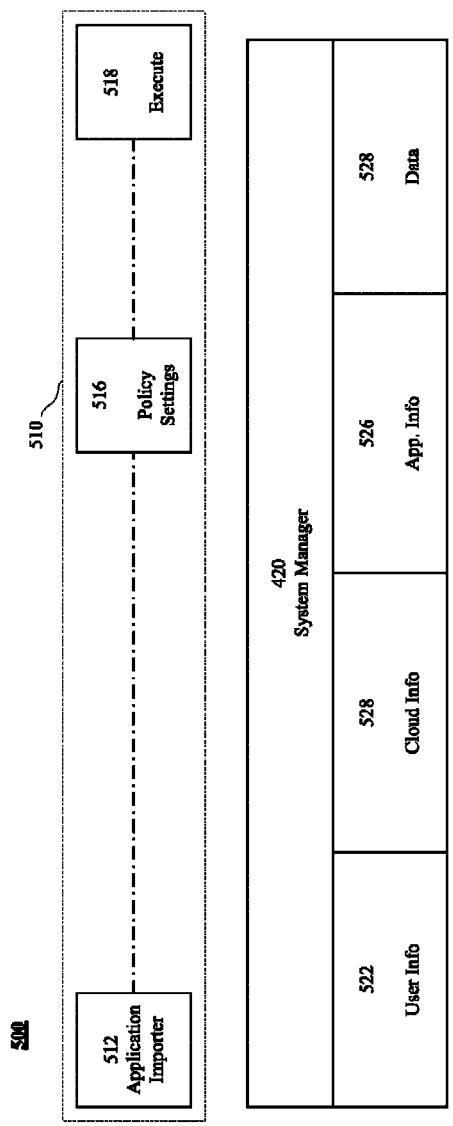
FIG. 5 shows the architecture of exemplary system manager 420 along with other modules and/or layers that interact with System Manager 420.

FIG. 5 shows the architecture 500 of exemplary system manager 420 along with other modules and/or layers that interact with System Manager 420. In some embodiments, System Manager 420 may interact with exemplary User Interface Layer 510, which, in turn, may facilitate user configuration of system 400. Exemplary User Interface Layer 510 may comprise Application Importer Module 512, Policy Setting Module 516, and Execute Module 518.

For example, Application Importer Module 512 may be used to import an application profile and/or to create a cloud agnostic representation 490 of a multi-tier application and perform other tasks. In addition, as indicated by the dashed lines, Exemplary Application Importer Module 512 may facilitate the importation of new applications and/or the migration of applications, services, and/or images in system 400. In some embodiments, imported applications may be displayed to users using a "desktop-style" view, where icons representing the various applications are shown to the user in a window or browser tab. In some embodiments, pre-published applications or service in a marketplace associated with system 400 (for example, applications in an application library or "app store" associated with or supported by system 400 may be imported by users directly onto their desktop view. In some embodiments, Application Importer Module 512 may allow users to license or buy one or more of pre-published applications or services (e.g. a database service). In general, any software application may be imported using exemplary Application Importer Module 512 in User Interface Layer 510.

Exemplary User Interface Layer 510 may also include various end-user modules that permit user customization and configuration of system 400. In some embodiments, Policy Settings Module 516 may provide appropriate graphical user interfaces and other features to permit users to set, modify, and/or delete policies, which may be implemented using a policy engine. For example, users may set policies that limit the clouds and/or configurations that specific user(s) and/or application(s) may use/migrate to, limit the monetary budget available for an application run or a series of runs, etc.

In some embodiments, Execute Module 518 may provide user interfaces to permit users to select a cloud agnostic representation of a multi-tier application and/or a cloud 472-i (from available clouds 472-1, 472-2 . . . 472-N), for execution of the multi-tier application. In some embodiments, the multi-tier application may then be launched on the selected second cloud 472-i.

For example, User Interface Layer 510 may include several other modules (not shown in FIG. 5) to allow users to specify system functionality related to reporting, auditing, billing, and permit viewing of application files and data on shared storage.

In addition System Manager 420 may also be used to manage automated tasks, which, in some embodiments, may have been initiated by DOE 430. System Manager 420 may also call or invoke functions implemented by DOE 430 in order to perform various system related activities. For example, System Manager 420 may invoke a secure communications module to facilitate secure communication with a new VM on a cloud 472-i. In some embodiments, System Manager 420 may maintain a relational database or data repository with information pertaining to system users including user authentication and authorization information; a list of clouds (472-1, . . . 472-N) and available cloud configurations for each cloud 472-i; policies that a user may have specified, etc.

In some embodiments, DOE 430 may use a common application or cloud agnostic representation, such as cloud agnostic representations 490 of a multi-tier application, to deploy and run the underlying software and/or multi-tier applications on any cloud, irrespective of implementation differences pertaining to the provisioning and utilization of application resources on the individual clouds, in part, by using functionality provided by Cloud Standardization Layer 460.

For example, cloud agnostic representation 490 of a multi-tier application may be obtained, at least in part, from metadata related to system configuration and application metadata (which, in some instances, may include dependency metadata and workflow descriptors 210). Cloud agnostic representation 490 may be used by DOE 730 to deploy and run the underlying multi-tier applications on various clouds 772.

As one example, service specific network ingress/egress rules specified as part of service configuration metadata for a service may be embodied in cloud agnostic representation 490 of a cloud based multi-tier application. The service specific network ingress/egress rules (as embodied in cloud agnostic representation 490 of a multi-tier application) may be used to facilitate network configuration for the service by DOE 430. For example, service configuration metadata for a MySQL service in an exemplary multi-tier application, may specify an Incoming Port for the MySQL service as Port 3306. Further, the ingress/egress rules may specify that components (e.g. services) in tiers that are directly connected to the MySQL service may communicate with the MySQL service. The ingress/egress rules for the exemplary MySQL service may further specify that components (e.g. services) in tiers that are not directly connected to the MySQL service may not communicate with the MySQL service.

Accordingly, in some embodiments, DOE 430 may use service specific network ingress/egress rules (as embodied in cloud agnostic representation 490 of a multi-tier application) to launch events (e.g. scripts) specifying network security policies for the cloud 472-i (on which the multi-tier application is being deployed) that will allow components in tiers directly connected to the MySQL service to connect to port 3306 on the node running the service. Further, services in tiers that are not directly connected to the MySQL service may be prevented from accessing port 3306 on node running the MySQL service. In some embodiments, the service ingress/egress rules specified as part of service configuration metadata may be used to enhance network security for the cloud based multi-tier application.

In some embodiments, the common application or cloud agnostic representation 490 may include application descriptors (not shown), which may be input to DOE 430. In some embodiments, a user may specify applications to import using Application Importer module 512 and application descriptors, which may include various primitives such as pattern and system primitives, may be used to describe applications to Cloud Standardization Layer 460.

DOE 430 may maintain routines and other program code that implement algorithms for orchestrating, deploying, optimizing, managing and monitoring application and VM runs on clouds. In some embodiments, one or more routines and other functions performed by DOE 430 may be managed and initiated by the System Manager 420. DOE 430 may also report back the status and results of the various orchestration activities to System Manager 420. In one embodiment, DOE 430 may directly query System Manager for information such as application data, policies, and cloud information.

Tasks performed by DOE 430 on Clouds 472 may be facilitated by Cloud Standardization Layer 460. For example, functionality provided by Cloud Standardization Layer 460 may facilitate the use of infrastructure independent or cloud agnostic representations of application code (such as cloud agnostic representation 490 of a multi-tier application) by DOE 430 to deploy multi-tier applications across clouds. In some embodiments, the infrastructure independent or cloud independent or cloud agnostic program code may be common across all clouds 472 because the Cloud Standardization Layer 460 may use functionality provided by Application Deployment Layer 470 to perform tasks for DOE 430 on any given cloud 472-*i*. For example, Cloud Standardization Layer 460 may use functionality provided cloud specific Plugins, APIs and Cloud Specific Libraries to perform tasks for DOE 430 on any given cloud 472-*i*.

Figure 6:
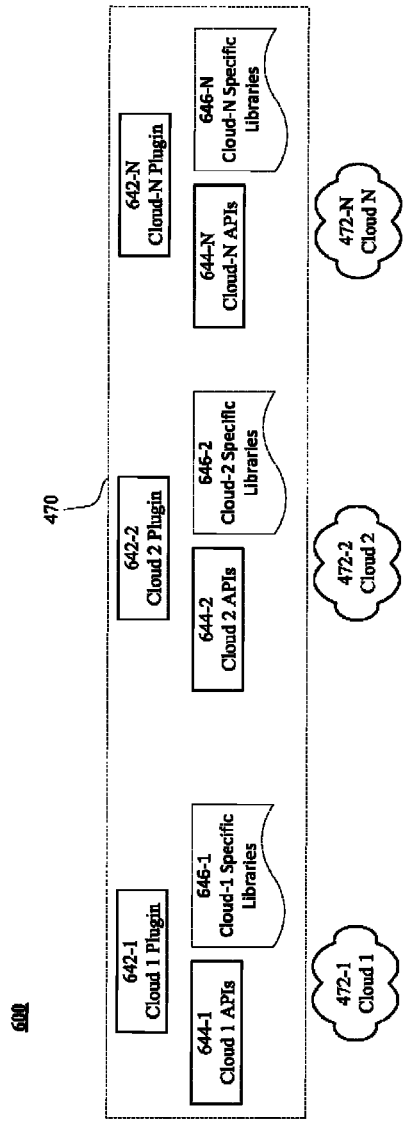
FIG. 6 shows an exemplary architecture of Application Deployment Layer 470.

FIG. 6 shows an exemplary architecture 600 of Application Deployment Layer 470. In some implementations, the deployment and running of applications and the dynamic management of clusters and other cloud resources may be facilitated by cloud Application Deployment Layer 470. Cloud Application Deployment Layer 470 may include Cloud Plugins 642, Cloud APIs 644 and Cloud Specific Libraries 646.

In some embodiments, the dynamic management of cloud resources may be facilitated by using a service such as a node management service running on gateway 480-*i* for a specific cloud 472-*i*. Gateway 480-*i* may also maintain Cloud APIs 644, such as Cloud-1 APIs 644-1, Cloud-2 APIs 644-2 . . . Cloud N APIs 644-N. In addition, gateway 480-*i* may also maintain Cloud specific Libraries 646, such as Cloud 1 Specific Libraries 646-1, Cloud 2 Specific Libraries 646-2, Cloud N Specific Libraries 646-N, etc. The node management service may act as an intermediate layer between the cloud provider 472-*i* and DOE 430 and facilitate the addition or removal of nodes.

Cloud Specific Libraries 646 and Cloud APIs 644 may comprise a library of implementations for primitives and composite interfaces, respectively, for a specific cloud 472-*i*. In some embodiments, Cloud APIs 644 and Cloud Specific Libraries 646 may be invoked using Cloud Plugins 642. For example, Cloud Plugins 642 may be used to invoke appropriate Cloud APIs 644 and routines from Cloud Specific Libraries 646 that facilitate the deployment and running of multi-tier applications on Clouds 472, where the multi-tier applications may have been described using cloud agnostic application descriptors and standardized primitives and using functionality provided by Cloud Standardization Layer 460.

In some embodiments, when a VM is to be deployed on a cloud 472, gateway 480 may use Cloud APIs 644 and Cloud Specific Libraries 646 library to perform deployment and execution tasks for that cloud 472. For example, shared storage primitives on Cloud Standardization Layer 460 may lead to instantiation of a DFS shared storage implementation on an Amazon™ cloud, while instantiating the shared storage implementation on a Terremark™ cloud will set up NAS/SAN. In some embodiments, gateway 480 may also launch one or more agents, which can be deployed on nodes on Clouds 472, to monitor and report task status back to gateway 380 and/or to perform other functions.

In some embodiments, functionality specified or configured by the user in User Interface Layer 510 may be implemented by one or more modules in cloud Application Deployment Layer 470, which, in some implementations, may include software agents running on a server and/or on the various clouds. These software agents may perform specific actions, monitor application runtime statistics, collect cloud related information such as but not limited to cloud load information, pricing information, security information etc., and/or collect information related to VM and/or user actions.

Figure 7:
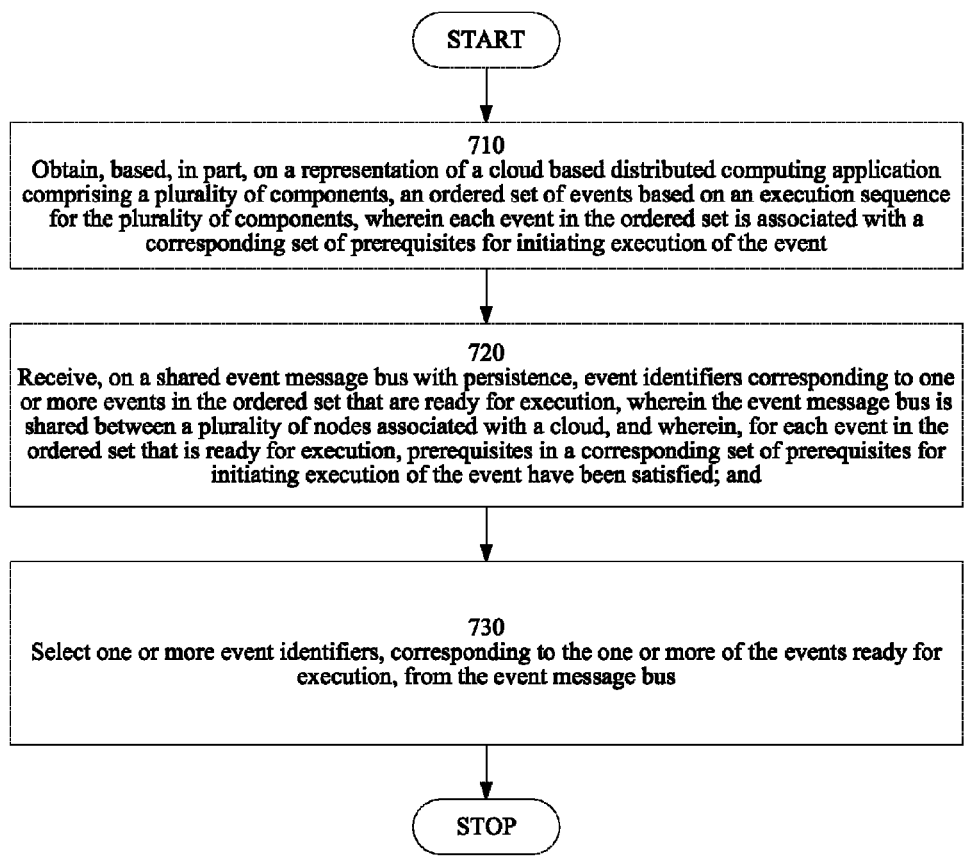
FIG. 7 shows a flowchart of an exemplary method for distributed orchestration of cloud based applications in a manner consistent with disclosed embodiments.

FIG. 7 shows a flowchart of an exemplary method 700 for distributed orchestration of cloud based applications in a manner consistent with disclosed embodiments. In some embodiments, in block 710, an ordered set of events based on an execution sequence for a plurality of components of a cloud based distributed computing application may be obtained, wherein each event in the ordered set is associated with a corresponding set of prerequisites for initiating execution of the event.

In block 720, event identifiers corresponding to one or more events in the ordered set that are ready for execution may be received on a shared event message bus with persistence (e.g. SEMB-P 220), wherein the event message bus is shared between a plurality of nodes associated with a cloud, and wherein, for each event in the ordered set that is ready for execution, prerequisites in a corresponding set of prerequisites for initiating execution of the event have been satisfied.

In block 730, one or more event identifiers, corresponding to the one or more of the events ready for execution may be selected from the event message bus. In some embodiments, the selection of the at least one event ready for execution may be performed by a node, based, at least in part, on a current workload of the node relative to workloads of individual nodes in a subset of the plurality of nodes.

In some embodiments, method 700 may be performed by a distributed orchestration engine (e.g. DOE 430) for the cloud-based distributed computing application using a subset of the plurality of distributed nodes. In some embodiments, the ordered set of events and the set of prerequisites for initiating execution of an event may be obtained, based further on a lifecycle stage associated with components of the cloud-based distributed computing application. In some embodiments, the lifecycle stage may be one of: startup, initialization, configuration, shutdown, scaling, migration, backup, upgrade or recovery.

In some embodiments, method 700 may further comprise: providing at least one of: (i) an indication that the one or more selected event identifiers have been selected, or (ii) an indication that the one or more selected event identifiers are unavailable for selection.

In some embodiments, method 700 may further comprise: initiating execution of one or more selected events, the one or more selected events corresponding to one or more of the selected event identifiers. In some embodiments, initiating execution of the one or more selected events may comprise: initiating execution of one or more sets of actions, wherein each of the one or more sets of actions: corresponds to a selected event in the one or more selected events; and is obtained from a corresponding event action map associated with the corresponding selected event, the corresponding event action map being obtained from the representation of the cloud based distributed computing application. In some embodiments, upon receiving an indication that execution of a subset of the one or more selected events is unsuccessful, the method may further comprise: rolling back any completed actions associated with the execution of the subset of the one or more selected unsuccessful events; and placing event-identifiers corresponding to events in the subset of the one or more selected unsuccessful events on the event message bus.

In some embodiments, method 700 may further comprise: receiving, on the shared event message bus with persistence, an indication of completion of the one or more events corresponding to the one or more selected event identifiers; determining one or more additional events that are ready for execution based, in part, on the received indication of completion; and placing one or more additional event identifiers corresponding to the one or more additional events that are ready for execution on the event message bus.

In some embodiments, the representation of the cloud based distributed computing application may take the form of a cloud agnostic representation of the cloud based distributed computing application. In some embodiments, the cloud agnostic representation of the cloud-based distributed computing application may comprises one or more of: application topology metadata for the cloud-based distributed computing application, the application topology metadata comprising dependency metadata for a plurality of components of the cloud-based distributed computing application, and/or configuration metadata for the plurality of components of the cloud-based distributed computing application, and/or lifecycle stage metadata for components of the cloud-based distributed computing application.

In some embodiments, the methods and modules described herein may be implemented using a variety of wired and/or wirelessly networked processors, various computers, and computing devices, including mobile devices such as smartphones, notebooks, and handheld computers, and various distributed computing systems including clouds. In some embodiments, the method and modules described herein may be embodied in computer-readable media, including magnetic and/or optical media and various types of non-volatile memory and/or media.

Other embodiments will be apparent to those skilled in the art from consideration of the specification and practice of one or more embodiments of the disclosed herein. It is intended that the specification and examples be considered as exemplary only, with a true scope and spirit of the invention being indicated by the following claims.

What is claimed is:

1. A processor-implemented method comprising:
   obtaining, based, in part, on a representation of a cloud-based distributed computing application comprising a plurality of components, an ordered set of events based on an execution sequence for the plurality of components, wherein each event in the ordered set is associated with a corresponding set of prerequisites for initiating execution of the event;
   receiving, on a shared event message bus with persistence, event identifiers corresponding to one or more events in the ordered set that are ready for execution, wherein the event message bus is shared between a plurality of nodes of a cloud, and wherein, for each event in the ordered set that is ready for execution, prerequisites in a corresponding set of prerequisites for initiating execution of the event have been satisfied; and
   selecting one or more event identifiers, corresponding to the one or more of the events ready for execution, from the event message bus.

2. The method of claim 1, further comprising:
   receiving, on the shared event message bus with persistence, an indication of completion of the one or more events corresponding to the one or more selected event identifiers;
   determining one or more additional events that are ready for execution based, in part, on the received indication of completion; and
   placing one or more additional event identifiers corresponding to the one or more additional events that are ready for execution on the event message bus.

3. The method of claim 1, wherein the representation of the cloud-based distributed computing application is a cloud agnostic representation of the cloud-based distributed computing application.

4. The processor-implemented method of claim 3, wherein cloud agnostic representation of the cloud-based distributed computing application comprises one or more of:
   application topology metadata for the cloud-based distributed computing application, the application topology metadata comprising dependency metadata for a plurality of components of the cloud-based distributed computing application,
   configuration metadata for the plurality of components of the cloud-based distributed computing application, and
   lifecycle stage metadata for components of the cloud-based distributed computing application.

5. The processor-implemented method of claim 1, further comprising:
   providing at least one of: (i) an indication that the one or more selected event identifiers have been selected, or (ii) an indication that the one or more selected event identifiers are unavailable for selection.

6. The processor-implemented method of claim 1, wherein the ordered set of events and the set of prerequisites for initiating execution of an event are obtained, based further on a lifecycle stage associated with components of the cloud-based distributed computing application.

7. The processor-implemented method of claim 6, wherein the lifecycle stage comprises one of: startup, initialization, configuration, shutdown, scaling, migration, backup, upgrade or recovery.

8. The processor-implemented method of claim 1, wherein the method is performed by a distributed orchestration engine for the cloud-based distributed computing application using a subset of the plurality of distributed nodes.

9. The processor-implemented method of claim 1, further comprising:
   initiating execution of one or more selected events, the one or more selected events corresponding to one or more of the selected event identifiers.

10. The processor-implemented method of claim 9, wherein initiating execution of the one or more selected events comprises:
    initiating execution of one or more sets of actions, wherein each of the one or more sets of actions:
      corresponds to a selected event in the one or more selected events; and
      is obtained from a corresponding event-action map associated with the corresponding selected event, the corresponding event action map being obtained from the representation of the cloud-based distributed computing application.

11. The processor-implemented method of claim 9, further comprising:
    upon receiving an indication that execution of a subset of the one or more selected events is unsuccessful:
      rolling back any completed actions associated with the execution of the subset of the one or more selected events; and
      placing event-identifiers corresponding to events in the subset of the one or more selected events on the event message bus.

12. The processor-implemented method of claim 1, wherein the selection of the at least one event ready for execution is performed by a node, based, at least in part, on a current workload of the node relative to workloads of individual nodes in a subset of the plurality of nodes.

13. An apparatus comprising:
a memory comprising a representation of a cloud-based distributed computing application comprising a plurality of components;
an event message bus with persistence,
a plurality of nodes of a cloud, wherein the plurality of nodes are coupled to the memory and the event message bus, wherein the plurality of nodes are configured to:
obtain, based, in part, on the representation of the cloud-based distributed computing application, an ordered set of events based on an execution sequence for the plurality of components, wherein each event in the ordered set is associated with a corresponding set of prerequisites for initiating execution of the event;
receive, on the shared event message bus, one or more event identifiers corresponding to one or more events in the ordered set that are ready for execution, wherein, for each event in the ordered set that is ready for execution, prerequisites in a corresponding set of prerequisites for initiating execution of the event have been satisfied; and
select, from the shared event message bus, one or more of the event identifiers corresponding to the one or more of the events ready for execution.

14. The apparatus of claim 13, wherein the plurality of nodes are further configured to:
receive, on the shared event message bus with persistence, an indication of completion of the one or more selected events;
determine one or more additional events that are ready for execution based, in part, on the received indication of completion; and
place one or more additional event identifiers, corresponding to the one or more of the additional events ready for execution on the event message bus.

15. The apparatus of claim 13, wherein the representation of the cloud-based distributed computing application in memory comprises a cloud agnostic representation of the cloud-based distributed computing application.

16. The apparatus of claim 15, wherein cloud agnostic representation of the cloud-based distributed computing application in memory comprises one or more of:
application topology metadata for the cloud-based distributed computing application, the application topology metadata comprising dependency metadata for a plurality of components of the cloud-based distributed computing application,
configuration metadata for the plurality of components of the cloud-based distributed computing application, and
lifecycle stage metadata for components of the cloud-based distributed computing application.

17. The apparatus of claim 13, wherein upon selection of the one or more event identifiers corresponding to the one or more events ready for execution by one or more corresponding nodes in the plurality of nodes, the one or more corresponding nodes are further configured to:
provide at least one of: (i) an indication that the one or more selected event identifiers have been selected, or (ii) an indication that the one or more selected event identifiers are unavailable for selection.

18. The apparatus of claim 13, wherein the plurality of nodes are configured to obtain the ordered set of events and the set of prerequisites for initiating execution of an event, based further on a lifecycle stage associated with the components of the cloud-based distributed computing application.

19. The apparatus of claim 18, wherein the lifecycle stage comprises one of: startup, initialization, configuration, shutdown, scaling, migration, backup, upgrade or recovery.

20. The apparatus of claim 13, wherein upon selection of the one or more event identifiers corresponding to the one or more events ready for execution by one or more corresponding nodes in the plurality of nodes, the one or more corresponding nodes are further configured to:
initiate execution of one or more selected events, the one or more selected events corresponding to one or more of the selected event identifiers.

21. The apparatus of claim 20, wherein to initiate execute the selected event, the one or more corresponding nodes are configured to:
initiate execution of one or more sets of actions, wherein each of the one or more sets of actions:
corresponds to a selected event in the one or more selected events; and
is obtained from a corresponding event-action map associated with the corresponding selected event, the corresponding event action map being obtained from the representation of the cloud-based distributed computing application.

22. The apparatus of claim 20, wherein upon receiving an indication that execution of a subset of selected events is unsuccessful:
rolling back any completed actions associated with the execution of the subset of selected events; and
placing event-identifiers corresponding to events in the subset on the event message bus.

23. A non-transitory computer-readable medium comprising instructions, which, when executed by a processor, perform steps in a method, the steps comprising:
obtaining, based, in part, on a representation of a cloud based distributed computing application comprising a plurality of components, an ordered set of events based on an execution sequence for the plurality of components, wherein each event in the ordered set is associated with a corresponding set of prerequisites for initiating execution of the event;
receiving, on a shared event message bus with persistence, event identifiers corresponding to one or more events in the ordered set that are ready for execution, wherein the event message bus is shared between a plurality of nodes of a cloud, and wherein, for each event in the ordered set that is ready for execution, prerequisites in a corresponding set of prerequisites for initiating execution of the event have been satisfied; and
selecting one or more event identifiers, corresponding to the one or more of the events ready for execution, from the event message bus.

24. The non-transitory medium of claim 23, the steps further comprising:
receiving, on the shared event message bus with persistence, an indication of completion of the one or more events corresponding to the one or more selected event identifiers;
determining one or more additional events that are ready for execution based, in part, on the received indication of completion; and
placing one or more additional event identifiers corresponding to the one or more additional events that are ready for execution on the event message bus.

25. The non-transitory medium of claim 23, the steps further comprising:
   initiating execution of one or more selected events, the one or more selected events corresponding to one or more of the selected event identifiers.

26. The non-transitory medium of claim 25, wherein initiating execution of the one or more selected events comprises the steps of:
   initiating execution of one or more sets of actions, wherein each of the one or more sets of actions:
      corresponds to a selected event in the one or more selected events; and
      is obtained from a corresponding event-action map associated with the corresponding selected event, the corresponding event action map being obtained from the representation of the cloud-based distributed computing application.

27. The non-transitory medium of claim 25, the steps further comprising:
   upon receiving an indication that execution of a subset of the one or more selected events is unsuccessful:
      rolling back any completed actions associated with the execution of the subset of the one or more selected events; and
   placing event-identifiers corresponding to events in the subset of the one or more selected events on the event message bus.

* * * * *